United States Patent [19]

Daws

[11] Patent Number: 5,074,228
[45] Date of Patent: Dec. 24, 1991

[54] APPARATUS AND METHODS FOR SELECTIVELY CREATING TRAMLINES

[76] Inventor: Gregory R. Daws, R.R. 1, Box 61, Michigan, N. Dak. 58259

[21] Appl. No.: 592,823

[22] Filed: Oct. 4, 1990

[51] Int. Cl.$^5$ .............................................. A01C 15/04
[52] U.S. Cl. ..................................... 111/175; 111/150
[58] Field of Search ............... 111/150, 157, 170, 174, 111/175, 903; 137/875, 625.46, 876; 406/183

[56] References Cited

U.S. PATENT DOCUMENTS

| | | | |
|---|---|---|---|
| 678,119 | 7/1901 | Lee | 137/625.46 |
| 1,519,213 | 12/1924 | Moore | 137/876 |
| 1,755,464 | 4/1930 | Williams | 137/875 |
| 2,968,266 | 1/1961 | Gustafson | 111/175 |
| 4,296,695 | 10/1981 | Quanbeck | 111/174 |
| 4,473,016 | 9/1984 | Gust | 111/174 |
| 4,503,786 | 3/1985 | Tautfest . | |
| 4,522,291 | 6/1985 | Smick | 111/175 |
| 4,562,968 | 1/1986 | Widmer et al. | 111/175 |
| 4,718,457 | 1/1988 | Luger | 137/875 |
| 4,836,250 | 6/1989 | Krambrock | 406/183 |
| 4,872,785 | 10/1989 | Schrage et al. . | |

FOREIGN PATENT DOCUMENTS

| | | | |
|---|---|---|---|
| 327907 | 8/1989 | European Pat. Off. | 111/170 |
| 2025039 | 12/1971 | Fed. Rep. of Germany | 111/175 |
| 3805148 | 12/1988 | Fed. Rep. of Germany | 111/175 |
| 1285395 | 1/1962 | France | 111/175 |
| 2578141 | 9/1986 | France | 111/175 |
| 64919 | 3/1989 | Japan | 406/183 |
| 1299531 | 3/1987 | U.S.S.R. | 111/175 |
| 2034562 | 6/1980 | United Kingdom | 111/170 |

Primary Examiner—Randolph A. Reese
Assistant Examiner—Spencer K. Warnick
Attorney, Agent, or Firm—L. MeRoy Lillehaugen; Alan Kamrath

[57] ABSTRACT

The selective creation of tramlines is disclosed where the metered seed normlly delivered through the outlet hose (18b) of the row planter unit (20b) corresponding to the desired location of the tramline is diverted by a butterfly valve (26) to one or both of the row planter units (20a, 30c) located adjacent to and on opposite sides of the row planter unit (20b). The butterfly valve (26) includes an inlet conduit (28) which intersects with first and second outlet conduits (30, 32) and a butterfly element (34) which is pivoted by a solenoid actuator (40) against the bias of a spring (36) to selectively block one of the outlet conduits (30, 32). In the preferred form, the diverting hose (44, 54, 56) from the butterfly valve (26) may extend through the housings (24) and be in direct communication with adjacent row planter units (20a, 20c) or may be connected to Y-shaped connectors (46) having a passage (50) intersecting with the passage (48) that the metered seed for the adjacent row planter units (20a, 20c) would normally pass for mixing the metered seed. A divider (52) may be provided for dividing the metered seed diverted by the butterfly valve (26) between the two adjacent row planter units (20a, 20c).

20 Claims, 1 Drawing Sheet

APPARATUS AND METHODS FOR SELECTIVELY CREATING TRAMLINES

BACKGROUND

The present invention relates generally to apparatus and methods for creating tramlines, particularly to apparatus and methods for creating tramlines utilizing pneumatic seed planters, and more particularly to apparatus and methods for creating tramlines utilizing air seeders.

The awareness of the value of the use of tramlines or tracks intentionally left unseeded in fields of small grain or like cultivated cross has been increasing with farmers. Specifically, tramlines can be utilized as markers or guides in the fields. For example, tramlines may be utilized while spraying herbicides or other chemicals to eliminate spray overlaps and skips. With high cost, low dose chemicals, overlaps result in increased chemical costs and potential crop injury, while skips result in untreated areas. Likewise, tramlines make it possible to spray in low light conditions thus making it possible to take advantage of cool, calm spraying conditions at night. Spraying at night or early morning is advantageous because less water is needed, as evaporation is less of a problem and dew may be taken advantage of. Further, the stoma openings on the plants' leaves are open so less chemical is needed for the desired results. Further, as no seeds are planted in the tramlines, anything growing in the tramlines indicates the presence of weeds or other wild seedlings such as wild oats.

Further, tramlines can be placed to correspond to the wheels of implements permitting multiple trips across the field without creating additional wheel tracks. Driving on plants may result in uneven maturation, which may be detrimental to the ability to straight combine the crop at harvest. Thus tramlines permit multiple trips across the field such as topdressing nitrogen late in the season to boost yields and protein in a good year, to apply fungicides and growth regulators as often as needed to guard a bumper crop against disease and lodging, and the like, without creating additional wheel tracks.

Prior to the present invention, tramlines were created by plugging the seed rows corresponding to the row where the tramline was desired. However, this had severe limitations in use. Specifically, plant population was reduced because seed was not planted in the blocked row. Further, it was often not necessary that tramlines be present on each pass of the drill. For example, if the width of the seed drill utilized is 41 feet (13 meters) and the width of the sprayer utilized is 82 feet (26 meters), tramlines are only necessary on one pass out of every two passes to create a pattern for spraying. Furthermore, when air seeders are utilized, the seed would often merely pile up behind the blocking means and when the blocking means was removed, the piled up seed would be simultaneously released creating an extreme seed population as well as wasting seed.

Thus a need exists to provide apparatus and methods for selectively creating tramlines in fields of cultivated crops which overcome the limitations of prior methods of creating tramlines.

Accordingly, it is an object of the present invention to provide novel apparatus and methods for selectively creating tramlines.

It is further an object of the present invention to provide such novel apparatus and methods where tramlines are created only on selective passes of the seeding device.

It is further an object of the present invention to provide such novel apparatus and methods where the delivery of the amount of metered seed which otherwise would have been delivered to the location of the tramline is not stopped or blocked.

It is further an object of the present invention to provide such novel apparatus and methods where the seed population is increased in the rows adjacent to the tramline to eventually cover and shade the tramline to help control weed growth in the tramline.

It is further an object of the present invention to provide such novel apparatus and methods where the metered seed which would have otherwise been delivered to the row planter unit corresponding to the desired location of the tramline is diverted to one or both of the adjacent row planter units.

SUMMARY

Surprisingly, the above objectives can be satisfied in the field of seeding devices in the most preferred forms by selectively diverting the metered seed from the row planter unit corresponding to the location where the tramline is desired to one or both of the row planter units located adjacent to and on opposite sides of the row planter unit of the tramline.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
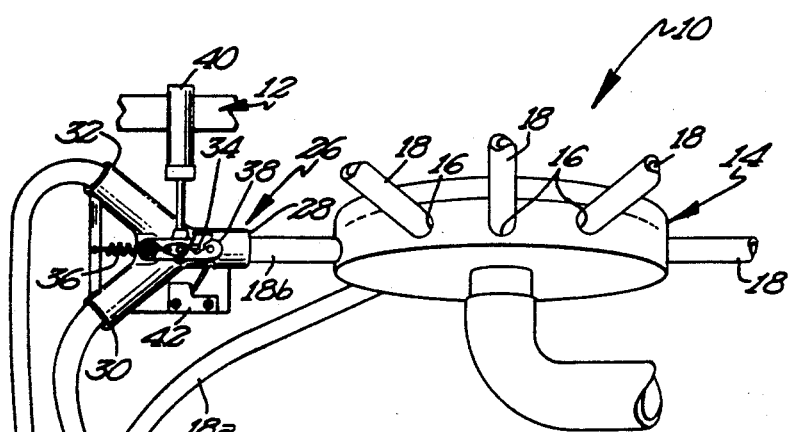
FIG. 1 shows a partial, perspective view of an air drill including an apparatus for selectively creating a tramline by methods according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "end", and similar terms are used herein, it should be understood that these terms have reference only to the structure shown in the drawings as it would appear to a person viewing the drawings and are utilized only to facilitate describing the invention.

DESCRIPTION

Apparatus for selectively creating tramlines by methods according to the preferred teachings of the present invention is shown in the drawings utilized in conjunction with an air drill 12 and generally designated 10. Air drill 12 generally includes a plenum 14 including a plurality of openings 16 around its periphery. Outlet hoses 18 extend from each opening 16 to a row planter unit 20, with drill 12 including a plurality of units 20 in a spaced, parallel arrangement. In the most preferred form, unit 20 is a furrow opener and includes first and second discs 22 held at an angle by a housing 24 to create a row opener for the seed. For each unit 20, hose 18 extends through housing 24 and drops the seed between discs 22 of unit 20. Plenum 14 is in communication with a forced air device, such as a centrifugal blower or fan, which forces air into outlet hoses 18 propelling metered seed out outlet hoses 18 to a row planter unit 20. It can then be appreciated that plenum 14 and hoses 18 deliver generally equal amounts of metered seeds to each of row planter units 20 for planting thereby into spaced, parallel rows.

Apparatus 10 generally includes a member for selectively diverting seed delivered to the outlet hose 18b of the planter unit 20b of the selected location along the width of air drill 12 and diverting such seed to one or both of planter units 20a and 20c located adjacent to and on opposite sides of planter unit 20b. In the preferred form, a butterfly valve 26 is interposed in hose 18b. Particularly, valve 26 includes a Y-shaped housing including a first inlet conduit 28 intersecting with first and second outlet conduits 30 and 32 at angles in the order of 135°. A butterfly element 34 is pivotally mounted adjacent to the intersection of conduits 30 and 32 and movable between a first position closing or blocking conduit 32 for preventing communication or passage of seed therethrough and allowing communication or passage of the metered seed between conduits 28 and 30 and a second position closing or blocking conduit 30 for preventing communication or passage of seed therethrough and allowing communication or passage of the metered seed between conduits 28 and 32. Element 34 is biased into its first position from its second position by a spring 36 having a first end anchored in a stationary position and second end attached to a lever arm 38 attached to the pivot axis of butterfly element 34. Element 34 is movable to its second position from its first position against the bias of spring 36 by a solenoid actuator 40 also secured to lever arm 38 for pivoting element 34 about its axis. Solenoid actuator 40 may be activated by any suitable means such as by a toggle switch located at a remote location such as in the cab of the tractor pulling air drill 12, by a computer chip which automatically activates and deactivates actuator 40 with each round of air drill 12, or by the like. It can be appreciated that element 34 may be moved by any other alternate motive means according to the teachings of the present invention. A suitable sensor 42 can be included to provide a signal such as an on/off light at a remote location such as in the cab of the tractor pulling air drill 12.

Conduits 28 and 30 are interposed in hose 18b such as by cutting hose 18b and attaching the outlet of the first part in communication with conduit 28 and attaching the inlet of the second part in communication with conduit 30.

The inlet of a diverting hose 44 is attached to and in communication with conduit 32. In a first preferred form shown in FIG. 1, the outlet of diverting hose 44 is in direct communication with unit 20a, extends through housing 24, and drops the seed between discs 22 of unit 20a generally parallel to seed dropped between discs 22 of unit 20a by hose 18a.

Figure 2:
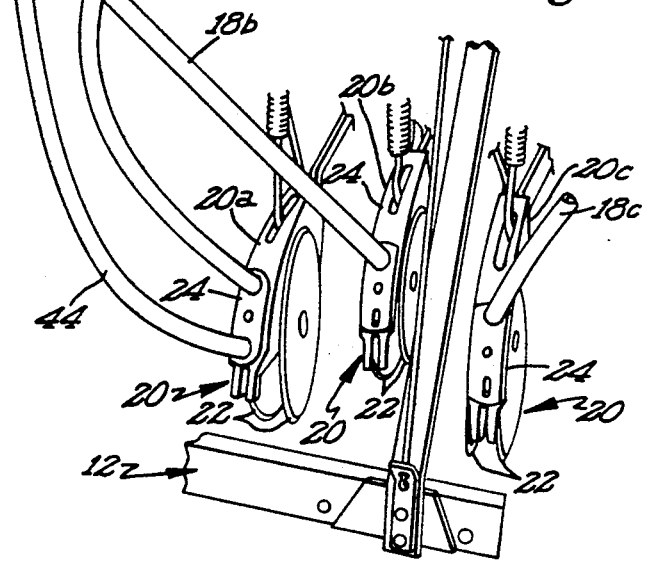
FIG. 2 shows a partial, diagramatic view of an air drill including an alternate embodiment of an apparatus for selectively creating a tramline by methods according to the preferred teachings of the present invention.
Figure 2:
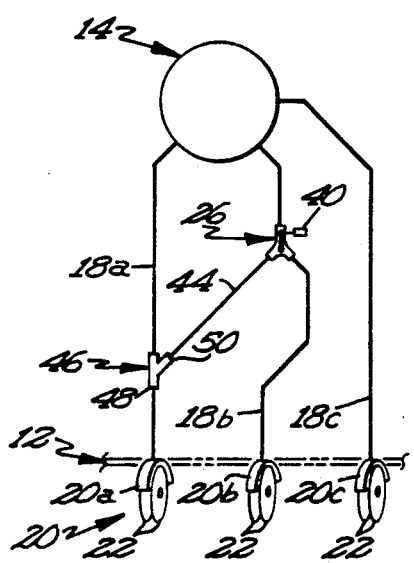

In an alternate form of the present invention shown in FIG. 2, hose 18a includes a Y-shaped connector 46 including a first straight passage 48 through which the metered seed would normally pass through hose 18a to unit 20a and a second, angled passage 50 intersecting with the passage 48 at an acute angle in the order of 30°. The outlet of diverting hose 44 is attached to and in communication with passage 50. Thus, seed passing through hose 44 would pass into connector 46 and mix with seed normally passing to unit 20a through hose 18a. It can be appreciated that connector 46 may be utilized when housing 24 of unit 20 does not have suitable space or provisions for connection of diverting hose 44 directly to unit 20 such as in a manner shown in FIG. 1.

Figure 3:
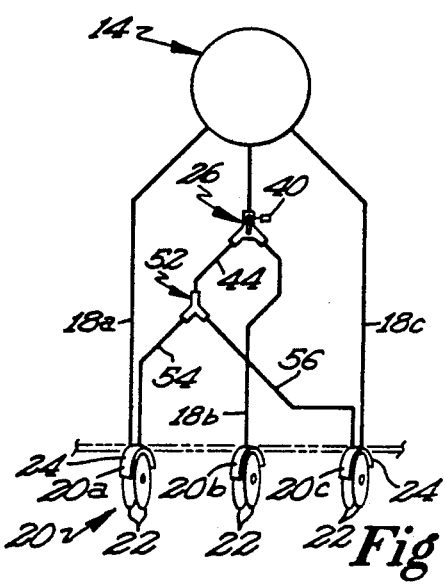
FIG. 3 shows a partial, diagramatic view of an air drill including an alternate embodiment of an apparatus for selectively creating a tramline by methods according to the preferred teachings of the present invention.
Figure 4:
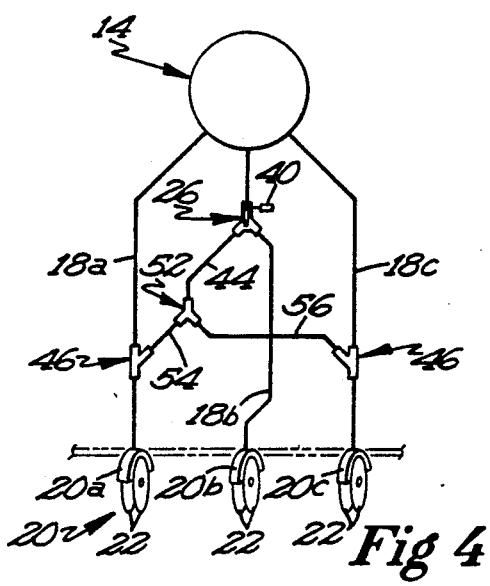
FIG. 4 shows a partial, diagramatic view of an air drill including an alternate embodiment of an apparatus for selectively creating a tramline by methods according to the preferred teachings of the present invention.

In still other alternate forms of the present invention shown in FIGS. 3 and 4, diverting hose 44 is in communication with a divider 52 which divides any seed between first and second subsidiary diverting hoses 54 and 56. The outlet of diverting hose 54 may either extend through housing 24 and drop seeds between discs 22 of unit 20a generally parallel to seed dropped between discs 22 of unit 20a by hose 18a in a manner as shown in FIG. 3 or may be attached to passage 50 of connector 46 interposed in hose 18a and mix seed with seed passing through hose 18a as shown in FIG. 4. The outlet of diverting hose 56 may either extend through housing 24 and drop seeds between discs 22 of unit 20c generally parallel to seed dropped between discs 22 of unit 20c by hose 18c in a manner as shown in FIG. 3 or may be attached to passage 50 of connector 46 interposed in hose 18c and mix seed with seed passing through hose 18c as shown in FIG. 4.

Now that the basic constructions of the preferred forms of apparatus 10 according to the preferred teachings of the present invention have been explained, the operation and advantages of apparatus 10 can be set forth and appreciated. Specifically, with element 34 of valve 26 in its first position, air drill 12 would operate as it would without apparatus 10 with seed being delivered by hoses 18 to all planter units 20. However, when a tramline is desired to be formed, solenoid actuator 40 may be activated to move butterfly element 34 of butterfly valve 26 from its first position to its second position against the bias of spring 36. With butterfly element 34 in its second position, seed passing through hose 18b is diverted from row planter unit 20b to row planter unit 20a in a manner shown in FIGS. 1 and 2 or to row planter units 20a and 20c in a manner as shown in FIGS. 3 and 4. As no seed passes to row planter unit 20b, no seeds are planted between row planter units 20a and 20c, with the spacing between row planter units 20a and 20c forming the tramline. When the desired tramline has been completed, solenoid actuator 40 may be deactivated allowing spring 36 to move butterfly element 34 from the second position to its first position. With butterfly element 34 in its first position, seed passing through hose 18b is again directed to row planter unit 20b.

It can then be appreciated that seed that would have gone into the tramline row of row planter unit 20b is diverted into the adjacent rows. Thus, hose 18b is not blocked and problems encountered when selected rows were blocked or when seed flow was stopped are eliminated. Specifically, seed does not collect in hose 18b as could occur if hose 18b was blocked but rather is diverted to adjacent rows. Thus, the plant population is not reduced as the diverted seeds are planted in the adjacent rows. The higher plant population in the adjacent rows to the tramline helps to eventually cover and shade the tramline to help control weed growth in the tramline. Although seed is not planted in the tramline, reducing the area actually planted, reduction in yield is not similarly reduced when seed is diverted to adjacent rows, especially when tramlines are spaced more than 36 feet (12 meters) apart. Furthermore, it should be noted that tramlines may be selectively created utilizing apparatus 10 according to the teachings of the present invention such that tramlines are created only on the desired passes to correspond to the desired pattern.

It should be noted that the angular relationships of conduits 28, 30, and 32 and of passages 48 and 50 allow the smooth transition of the seeds therethrough without creating abutments which may cause the seeds to pile up behind or which the seeds may strike causing seed breakage. This feature is particularly important when apparatus 10 is utilized in an air drill 12 as in the preferred form where delivery of the seed is made by propelling the seed utilizing forced air.

It can then be appreciated that apparatus 10 allows the creation of tramlines in fields, with such tramlines obtaining the many advantages associated therewith including providing guides for spraying, providing locations for observing undesired plant growth, providing implement paths in the fields, and like advantages. Further, apparatus 10 allows the creation of such tramlines without encountering problems previously occurring in the creation of tramlines. Thus, apparatus 10 will further encourage the use of tramlines by farmers.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a seeding device having a multiplicity of row planter units, said row planter units including at least a first row planter unit located adjacent to a second row planter unit and a third row planter unit located adjacent to the second row planter unit, with the second row planter unit being intermediate the first and third row planter units, first means for delivering metered seed to the first row planter unit, second means for delivering metered seed to the second row planter unit, and third means for delivering metered seed to the third row planter unit, an apparatus for selectively creating a tramline comprising means located in the second means for diverting all of the metered seed of the second means from the second row planter unit to at least one of the first and third row planter units for planting with the metered seed delivered by the first and third means, with the seed diverted from the second means creating rows as defined by the first and third row planter units adjacent to the tramline having higher plant population than the rows defined by the remaining row planter units of the multiplicity of row planter units.

2. The tramline apparatus of claim 1 wherein the first and second means of the seeding device include outlet hoses extending to the row planter units; and wherein the diverting means comprises, in combination: a valve located in the outlet hose of the second means, with the valve having a first position allowing communication of the metered seed of the second means through the outlet hose of the second means to the second row planter unit while preventing communication of the metered seed of the second means to the first row planter unit and a second position allowing communication of the metered seed of the second means to the first row planter unit while preventing communication of the metered seed of the second means to the second row planter unit; and means for moving the valve between its first and second positions.

3. The tramline apparatus of claim 2 wherein the valve comprises, in combination: a Y-shaped housing including an inlet conduit intersecting with a first outlet conduit and a second outlet conduit, with the inlet conduit intersecting with the first and second outlet conduits at angles in the order of 135°, with the metered seed of the second means being delivered to the inlet conduit, with the first outlet conduit being in communication with the first row planter unit and the second outlet conduit being in communication with the second row planter unit; and an element for selectively blocking the first and second outlet conduits of the valve, with the element in the first position of the valve blocking the first outlet conduit and allowing communication between the inlet conduit and the second outlet conduit and with the element in the second position of the valve blocking the second outlet conduit and allowing communication between the inlet conduit and the first outlet conduit; and wherein the moving means comprises means for moving the element between the first and second positions.

4. The tramline apparatus of claim 3 wherein the valve is a butterfly valve and wherein the element is a butterfly element and is pivotal by mounted between the first and second positions; and wherein the moving means comprises means for pivoting the butterfly element between the first and second positions.

5. The tramline apparatus of claim 4 wherein the pivoting means comprises, in combination: means for biasing the butterfly element from the second position to its first position; and a solenoid actuator for pivoting the butterfly element from its first position to its second position against the bias of the biasing means.

6. The tramline apparatus of claim 3 wherein the valve in its second position is in direct communication with the first row planter unit.

7. The tramline apparatus of claim 3 wherein the diverting means further comprises, in combination: a connector in the outlet hose of the first means, with the connector having a first passages for the metered seed of the first means to the firs row planter unit and having a second passage intersecting with the first passage, with the valve in its second position being in communication with the second passage for mixing the metered seed of the second means with the metered seed of the first means for passage to the first row planter unit.

8. The tramline apparatus of claim 3 wherein the diverting means further comprises, in combination: a divider in communication with the first outlet conduit of the valve for dividing the metered seed between a first subsidiary diverting hose and a second subsidiary diverting hose, with the first subsidiary diverting hose being in communication with the first row planter unit, with the second subsidiary diverting hose being in communication with the third row planter unit, with the metered seed of the second means being diverted to the first and third planter units when the valve is located in the first position.

9. The tramline apparatus of claim 8 wherein the first subsidiary directing hose is in direct communication with the first row planter unit and the second subsidiary directing hose is in direct communication with the third row planer unit.

10. The tramline apparatus of claim 8 further comprising, in combination: a first connector in the outlet hose of the first means, with the first connector having a first passage for the metered seed of the first means to the first row planter unit and having a second passage intersecting with the first passage, with the first subsidiary diverting hose being in communication with the second passage of the first connector for mixing the metered seed of the second means with the metered seed of the first means for passage to the first row planter unit; a second connector in the outlet hose of the third means, with the second connector having a first passage for the metered seed of the third means to the third row planter unit and having a second passage intersecting with the first passage, with the second subsidiary diverting hose being in communication with the second passage of the second connector for mixing the metered seed of the second means with the metered seed of the third means for passage to the third row planter unit.

11. The tramline apparatus of claim 2 wherein the valve in its second position is in direct communication with the first row planter unit.

12. The tramline apparatus of claim 2 wherein the diverting means further comprises, in combination: a connector in the outlet hose of the first means, with the connector having a first passage for the metered seed of the first means to the first row planter unit and having a second passage intersecting with the first passage, with the valve in its second position being in communication with the second passage for mixing the metered seed of the second means with the metered seed of the first means for passage to the first row planter unit.

13. The tramline apparatus of claim 1 wherein the diverting means comprises means for diverting the metered seed of the second means from the second row planter unit to both the first and third row planter units for planting with the metered seed delivered by the first and third means.

14. The tramline apparatus of claim 13 wherein the diverting means comprises, in combination: a divider for dividing the metered seed between a first subsidiary diverting hose and a second subsidiary diverting hose, with the first subsidiary diverting hose being in communication with the first row planter unit, with the second subsidiary diverting hose being in communication with the third row planter unit; and a valve located in the second means having a first position allowing communication of the metered seed to the second row planter unit while preventing communication of the metered seed to the divider and a second position allowing communication of the metered seed to the divider while preventing communication of the metered seed to the second row planter unit.

15. The tramline apparatus of claim 14 wherein the first and second means of the seeding device delivers metered seed to the row planter units through the use of forced air.

16. A method for selectively creating a tramline utilizing a seeding device having a multiplicity of row planter units, said row planter units including at least a first row planter unit located adjacent to a second row planter unit and a third row planter unit located adjacent to the second row planter unit, with the second row planter unit located intermediate the first and third row planter units, comprising the steps of:
   a) delivering an amount of metered seed for planting by the first row planter unit;
   b) delivering a generally equal amount of metered seed for planting by the second row planter unit;
   c) delivering a generally equal amount of metered seed for planting by the third row planter unit; and
   d) selectively diverting all of the metered seed being delivered to the second row planter unit to at least one of the first and third row planter units for planting with the metered seed being delivered to the first and third row planter units to create an unseeded tramline defined by the second row planter unit and to create rows as defined by the first and third row planter units adjacent to the tramline having higher plant population than the rows defined by the remaining row planter units of the multiplicity of row planter units.

17. The method of claim 16 wherein the selectively diverting step comprises the step of selectively diverting the metered seed being delivered to the second row planter unit and dividing the metered seed between both the first and third row planter units for planting with the seed being delivered to the first and third row planter units to create an unseeded tramline defined by the second row planter unit.

18. The method of claim 16 wherein the delivering steps comprises the steps of providing outlet hoses; and propelling the metered seed through the outlet hoses with forced air.

19. The method of claim 18 wherein the diverting means comprises the step of moving a valve between a first position and a second position, with the first position of the valve being in communication with the second row planter unit while preventing communication with the first row planter unit and the second position of the valve being in communication with the first row planter unit while preventing communication with the second row planter unit.

20. The method of claim 19 wherein the second position of the valve is in communication with the outlet hose of the first row planter unit for mixing the metered seed of the second row planter unit with the metered seed of the first row planter unit while in the outlet hose of the first row planter unit.

* * * * *

UNITED STATES PATENT AND TRADEMARK OFFICE
CERTIFICATE OF CORRECTION

PATENT NO. : 5,074,228

DATED : December 24, 1991

INVENTOR(S) : Gregory R. Daws

It is certified that error appears in the above-identified patent and that said Letters Patent is hereby corrected as shown below:

On the title page:

In the Abstract, line 2, cancel "normlly" and substitute therefor --normally--.

In the Abstract, line 6, cancel "30c)" and substitute therefor --20c)--.

Column 1, line 14, cancel "cross" and substitute therefor --crops--.

Claim 4, line 3, cancel "pivotal by" and substitute therefor --pivotably--.

Claim 7, line 4, cancel "passages" and substitute therefor --passage--.

Claim 7, line 5, cancel "firs" and substitute therefor --first--.

Signed and Sealed this

Sixth Day of April, 1993

*Attest:*

STEPHEN G. KUNIN

*Attesting Officer*     *Acting Commissioner of Patents and Trademarks*